…

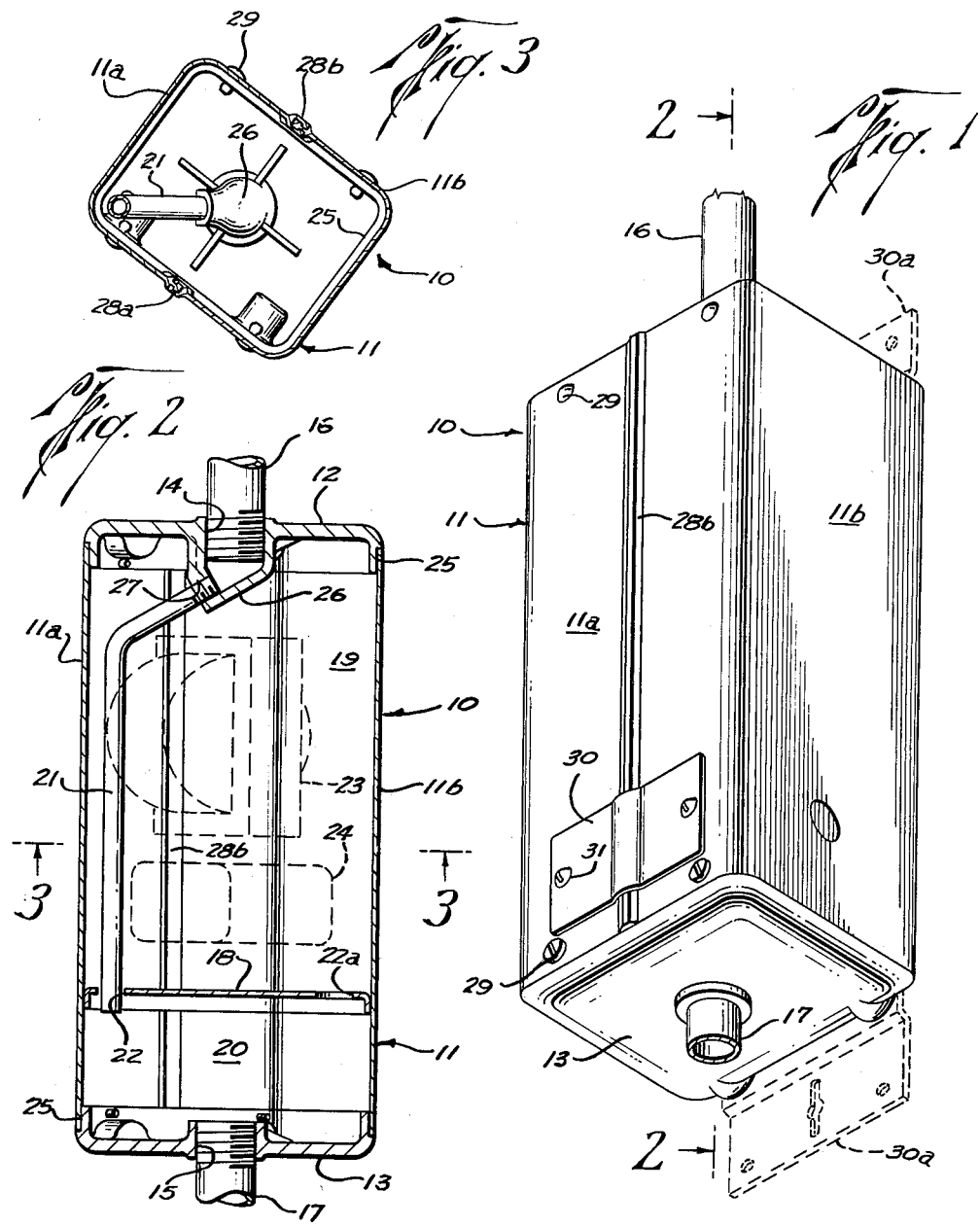

United States Patent Office 3,197,545
Patented July 27, 1965

3,197,545
CASE FOR BALLAST TYPE TRANSFORMERS
Buell Moore, Houston, Tex., assignor to Esquire, Inc., New York, N.Y., a corporation of Delaware
Filed Dec. 10, 1962, Ser. No. 243,429
3 Claims. (Cl. 174—52)

This invention relates to cases for ballast type transformers for light fixtures; and, more particularly, to improvements in such cases wherein the electricity is fed through the transformer from the power source to the light fixture.

In prior equipment of this general type, the transformer is sealed off within a chamber of the case intermediate upper and lower wiring chambers, and there is an opening in each end of the case connecting with the wiring chambers. A pipe leading from a power source connects with the upper or inlet opening and a pipe leading to the light fixture connects with the lower or outlet opening, so that the ballast and fixture may be suspended by means of the pipes in balanced relation. Suitable electrical wires are extended through the pipes for connection with the primary and secondary of the transformer within the upper and lower wiring chambers, and access is had to each wiring chamber by means of additional openings in the case which are normally closed by removable inspection plates. Generally, these cases have been formed of sheet metal sections making up the respective chambers and assembled with one another by connecting flanges.

An object of this invention is to provide a case of the general type above described having only a single chamber in which wiring connections must be made, thereby simplifying not only its construction but also its inspection and repair.

Another object is to provide such a case with the transformer and wiring chambers so arranged as to facilitate sealing and assembly of the transformer therein.

A further object is to provide such a case which is made up of a minimum number of relatively inexpensive and readily attachable and detachable parts.

These and other objects are accomplished, in accordance with the present invention, by a hollow case which is divided into a transformer chamber adjacent its upper end and a wiring chamber adjacent its lower end and connecting with the outlet opening therefrom. A conduit connects the inlet opening in the upper end of the case with the wiring chamber to by-pass the transformer chamber. In this way, the electrical wires from the power source may extend from the inlet opening through the conduit for connection with the primary of the transformer in the single wiring chamber. Additional electrical wires are, of course, connected to the secondary of the transformer in the same chamber for extension through the outlet opening to the light fixture. Access may be had to the electrical connections with either the primary or the secondary through a single inspection plate for the one wiring chamber.

The by-pass conduit extends laterally from its connection with the inlet opening toward a corner of the transformer chamber and then longitudinally thereof so as to provide as large a space as possible for the transformer. The free end of the conduit is received through a hole in a plate which extends laterally across the case to separate the transformer and wiring chambers. The case includes a central portion and covers removably connected to the open upper and lower ends of the central portion, and the plate is movable through one open end of the central portion. This central portion is preferably made from extruded metal, and the covers are made of suitable castings having the inlet and outlet openings formed therein to receive the suspension pipes.

With the bottom cover removed, the remainder of the case may be turned upon its upper end to receive the transformer and the potting compound in which the transformer is to be sealed. This compound is contained since the conduit closes the inlet opening in the top cover. The plate may be moved into place over the free end of the conduit and against the upper level of the potting compound and the bottom cover assembled over the open lower end of the central portion of the case.

In the drawings, wherein like reference characters are used throughout to designate like parts:

FIG. 1 is a perspective view of front, side and bottom of a case constructed in accordance with a preferred embodiment of the present invention;

FIG. 2 is a longitudinal sectional view of the case, as seen along broken line 2—2 of FIG. 1;

FIG. 3 is a cross-sectional view of the case, as seen along broken line 3—3 of FIG. 2; and FIG. 4 is an enlarged sectional view of the joint between the parts making up the central portion of the case.

With reference now to the details of the above-described drawings, the hollow case, which is designated in its entirety by reference character 10, is made up of a central portion 11 which is open at both ends and upper and lower covers 12 and 13, respectively, closing such ends. There is a threaded inlet opening 14 in the upper cover 12 for connection with a pipe 16 which suspends the transformer and conducts electrical wires to it from the power source. There is also a threaded outlet opening 15 in the lower cover 13 for connection with another pipe 17 for suspending the light fixture (not shown) from the transformer and conducting electrical wires from it to the light fixture.

A plate 18 extends laterally across the case to divide it into a transformer chamber 19 adjacent its upper end and a wiring chamber 20 adjacent its lower end. As can be seen from FIG. 2, the wiring chamber connects with the outlet opening 15, and conduit 21 connects at one end with the inlet opening 14. The other end of conduit 14 extends through a hole 22 in the plate 18 to connect with the wiring chamber and thereby by-pass the transformer chamber. As previously described heretofore, and as best shown in FIG. 3, the conduit extends laterally of its connection with the opening toward a corner of the transformer chamber 19 and then longitudinally downwardly through the hole in plate 18.

In this way, there is little or no interference with the transformer 23 and capacitor 24 which, as shown by the broken lines of FIG. 2, are to be contained within the transformer chamber 19. More particularly, the transformer and capacitor are sealed within such chamber by a suitable plotting compound, as will be described more fully hereinafter.

The primary and secondary of the transformer have suitable parts which may extend through the hole 22a in plate 18 for connection within the wiring chamber 20 with the electrical wires from the power source and to the light fixture. As previously described, the first-mentioned wires extend through the inlet opening 14 and conduit 21 for connection with the primary of the transformer, while the wires extending through the outlet opening 15 for connection with the light fixture are connected to the secondary of the transformer. However, since the present invention is concerned only with the case, rather than with the transformer, such wiring connections need not be shown in the drawings. As previously mentioned, access is had to the wiring chamber through an opening (not shown) which is normally covered by a removable inspection plate 30, which, as shown in FIG. 1, is attached to the side of the central portion of the case by means of screws 31.

As also mentioned above, the covers 12 and 13 are preferably cast, with the openings 14 and 15 therein threaded to receive the pipes 16 and 17. More particularly, these covers are provided with inwardly extending rims 25 which fit tightly within the opposite open ends of the central portion of the case. The upper cover 12 includes a laterally extending socket 26 which forms a continuation of the opening 14 and is threaded at 27 to receive the upper end of conduit 21.

The central metal portion of the case comprises a pair of identical extruded parts 11a and 11b, each being provided along each opposite edge with interfitting tongue and groove connections 28a and 28b, respectively. As best shown in the detail of FIG. 4, these connections provide a smooth seam along the front and back of the case. Upon extrusion, these separate parts of the central portion of the case may be interfitted with one another by a simple sliding movement. The covers are in turn fitted to the so formed open ends of the central portion and releasably connected thereto by screws 29 or the like.

In the assembly of the transformer within the case, the upper cover 12 is first connected to the central portion 11 of the case, and the conduit 21 is connected to the socket 26 of the inlet opening in such cover. The case is then inverted to dispose its open lower end in an upwardly facing position to permit the transformer 23 and capacitor 24 to be lowered into position in the chamber 19. At this time, a suitable potting compound, such as "Mylar," may be poured into the case to cover the transformer and capacitor, but to a level below the open end of the conduit 21. The tight fit of the cover 12 within the open upper end of the central portion of the case as well as the connection of the conduit 21 in the inlet opening socket will contain the compound as it sets up. To complete the assembly, the plate 18 may be lowered into the case with its hole 22 passing over the end of the conduit, and the lower cover 13 may then be fitted into the open lower end of the central portion and attached thereto by the screws 29. At this time, the case is ready for the various wiring connections heretofore described.

Although it is contemplated that the case will be suspended from the pipe 16 and the light fixture in turn suspended from the case by the pipe 17, whereby electricity is "fed through" the transformer, brackets 30a (shown in broken lines) may be provided for separately attaching the case to any suitable support.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. In a ballast type transformer, a hollow case having an opening in its opposite ends, means about each opening for connection to a pipe, means dividing the case into a transformer chamber adjacent one end and a wiring chamber adjacent the other end and connecting with the opening therein, a transformer positioned entirely within said transformer chamber, conduit means extending through the transformer chamber and connecting the opening in said one end of the case with the wiring chamber to bypass the transformer chamber, said dividing means having an opening therein providing communication between the transformer and wiring chambers, and an inspection plate providing access to the wiring chamber.

2. In a ballast type transformer of the character defined in claim 1, wherein said openings in said opposite ends of said case are at least substantially aligned with one another and formed symmetrically of the ends of the case.

3. In a ballast type transformer, a hollow case having a wall extending laterally thereacross to divide it into a transformer chamber at one end and a wiring chamber at the other end, a transformer positioned entirely within said transformer chamber, an inlet through the one end of the case and an outlet through the other end thereof connecting with the wiring chamber, said inlet and outlet being at least substantially aligned with one another and arranged symmetrically of said ends of the case, a conduit connecting at one end with the inlet and extending through the wall to connect at its other end with the wiring chamber, said wall having an opening therein providing communication between the transformer and wiring chambers, means providing an opening through a side of the case for access to the wiring chamber, and an inspection plate releasably attached to the case for covering the access opening.

References Cited by the Examiner
UNITED STATES PATENTS

| | | | |
|---|---|---|---|
| 2,606,218 | 8/52 | Wickman | 174—52 X |
| 2,740,905 | 4/56 | Henderson | 174—52 |
| 2,779,496 | 1/57 | Henderson | 174—60 |
| 2,779,812 | 1/57 | Rowe | 174—50 |
| 2,924,796 | 2/60 | Stauber et al. | 336—96 |

DARRELL L. CLAY, *Primary Examiner.*

JOHN P. WILDMAN, JOHN F. BURNS, *Examiners.*